United States Patent [19]

Schmidt

[11] Patent Number: 4,694,944

[45] Date of Patent: Sep. 22, 1987

[54] OVERLOAD CLUTCH PARTICULARLY FOR THREAD-CUTTING CHUCKS OR THE LIKE

[75] Inventor: Wolfgang Schmidt, Lauf, Fed. Rep. of Germany

[73] Assignee: Emuge-Werk Richard Glimpel Fabrik fuer Praezisionswerkzeuge (vormals Moschkau & Glimpel), Lauf, Fed. Rep. of Germany

[21] Appl. No.: 774,832

[22] Filed: Sep. 11, 1985

[30] Foreign Application Priority Data

Oct. 11, 1984 [DE] Fed. Rep. of Germany ....... 3437269

[51] Int. Cl.$^4$ ................... F16D 43/20; F16D 7/06
[52] U.S. Cl. ...................... 192/56 R; 192/93 R; 464/36
[58] Field of Search ............... 192/56 R, 93 R, 93 A; 464/36, 38

[56] References Cited

U.S. PATENT DOCUMENTS

| | | | |
|---|---|---|---|
| 2,969,132 | 1/1961 | Stewart | 192/56 R |
| 3,185,275 | 5/1965 | Orwin | 192/56 R |
| 3,319,753 | 5/1967 | Orwin et al. | 192/56 R |
| 4,041,729 | 8/1977 | Bilz | 192/56 R |
| 4,263,996 | 4/1981 | Putney | 192/56 R |
| 4,449,954 | 5/1984 | Krude | 464/36 |

FOREIGN PATENT DOCUMENTS

| | | | |
|---|---|---|---|
| 1101059 | 3/1961 | Fed. Rep. of Germany | 192/56 R |
| 2828809 | 1/1980 | Fed. Rep. of Germany | 464/36 |
| 846862 | 7/1981 | U.S.S.R. | 464/36 |
| 929904 | 5/1982 | U.S.S.R. | 464/36 |

Primary Examiner—Rodney H. Bonck
Assistant Examiner—David A. Testardi
Attorney, Agent, or Firm—Jordan and Hamburg

[57] ABSTRACT

A safety or overload clutch, particularly for thread-cutting chucks or quick-change inserts thereof, has a cylindrical clutch ring and a chuck body mounted coaxially inside the clutch ring, with a ball pocket clutch arranged between the inside surface of the clutch ring and the external surface of the chuck body. The ball pocket clutch provides for an adjustable releasing or disengagement of the torque, whereby one of the surfaces is provided with ball pockets of less depth than the diameter of the clutch balls, and the opposite surface is provided with counterpockets having release or disengagement openings, in which, in case of an overload, the clutch balls can escape against the effect of a spring-stressed axial pressure ring into a stable release position. The pressure ring is movable in the clutch ring, whereby the ball pockets are axially extending grooves and the counterpockets, at least on one side, open into open release channels which are axially offset in relation to the pressure ring, whereby the width of the release channels basically corresponds to the diameter of the clutch balls.

19 Claims, 16 Drawing Figures

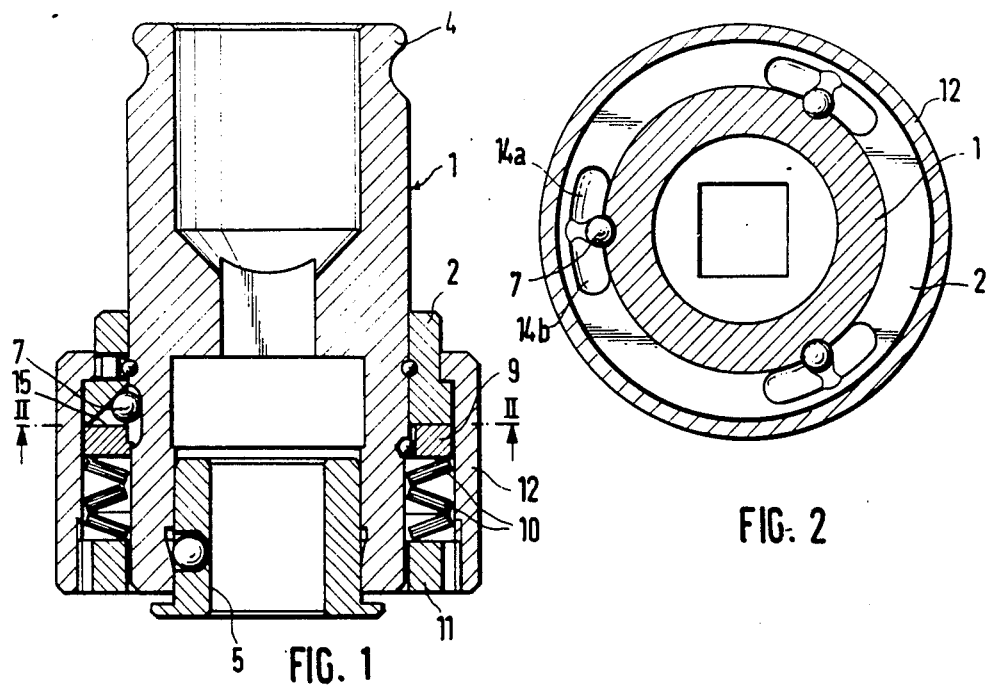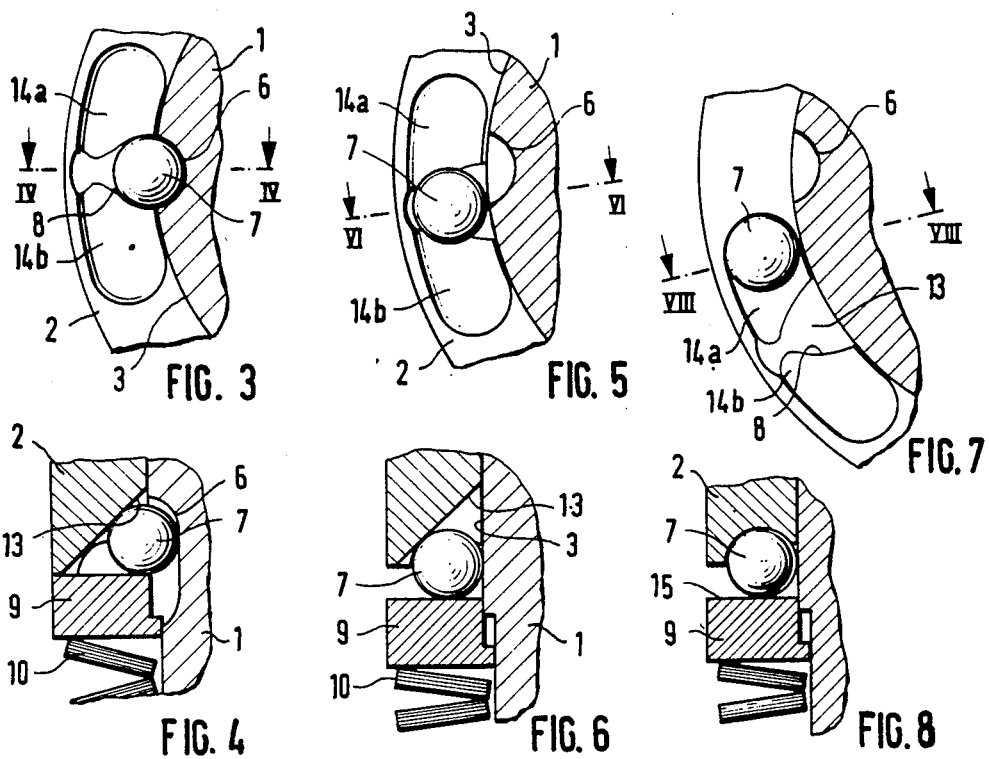

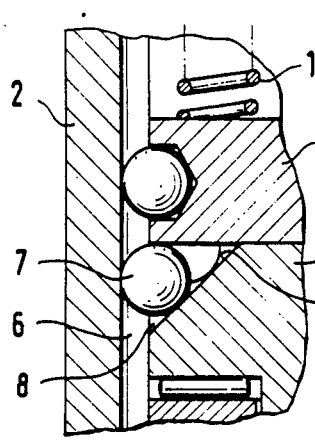 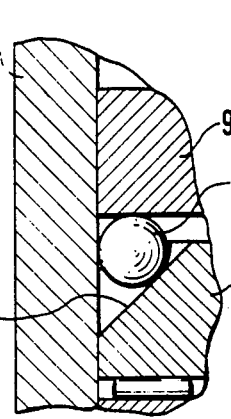 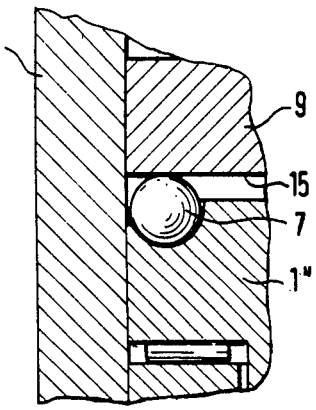
FIG. 11        FIG. 13        FIG. 15
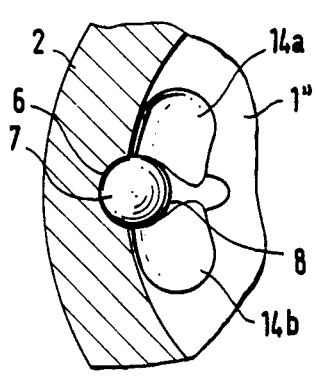 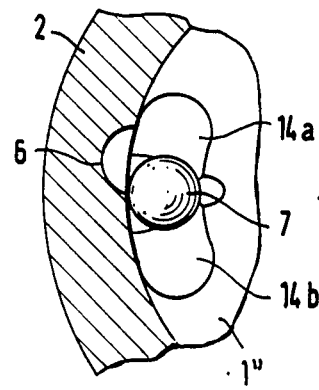 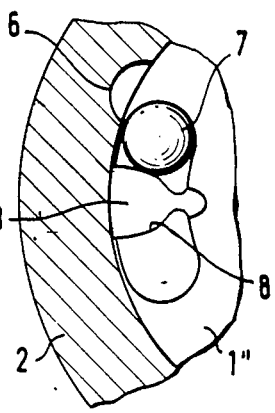
FIG. 12        FIG. 14        FIG. 16

OVERLOAD CLUTCH PARTICULARLY FOR THREAD-CUTTING CHUCKS OR THE LIKE

The invention relates to an overload or safety clutch, particularly for thread-cutting chucks, or quick-change inserts thereof, having a cylindrical clutch ring and a coaxial chuck body or insert held with the clutch ring by means of a ball pocket clutch arranged between an inner surface of the clutch ring and an outer surface of the chuck body, the ball pocket clutch providing for adjustably disengaging the torque, whereby one of the surfaces is provided with ball pockets of less depth than the diameter of the clutch balls, whereas the opposite surface is provided with counterpockets with release openings, into which the clutch balls can pass during an overload against the action of a spring-stressed pressure ring which is moveable in the axial direction into a stable release position.

Such overload clutches are required, for example, for thread-cutting chucks or for quick-change inserts provided therefor, for instance, in order to protect a driven tap drill from breaking, for instance, when running-up on the foundation of a blind-end bore or when the tap drill has become dull which requires higher torque absorption.

For the sake of simplicity, in the following, only a chuck body will be discussed, although it could also refer to an insert.

A safety clutch of the initially described kind is known from German Auslegeschrift No. 25 11 148, wherein the clutch jacket is configured as a drive jacket provided with radially extending inclined slots forming counterpockets, whereby pressing-in the clutch balls into the spherical-shaped ball pockets of the outer surface of the continuous chuck body takes place by means of a conical arrangement of the inside surface of the pressure ring. During an overload, the clutch balls are presssed out of the ball pockets and thus shift the pressure ring over the conical surface against the action of the springs, the spring force of the springs being adjustable; in order to be deposited under radial movement, in the continuous slots of the clutch ring, and finally on the narrow front edge of the pressure ring.

Disregarding the fact that this known safety clutch can only be used for apparatus with motor-driven clutch rings, and thus is not suitable for clutches with driven chuck bodies, this safety clutch has the decisive disadvantage of not having a stable release position. The stability of the release position depends on how exactly the balls in the release position run on a narrow edge enclosing the inside cone of the pressure ring. Furthermore, due to the very great forces exerted during frequent operation of the safety clutch, this small edge is unavoidably exposed to great wear, with the effect, that this kind of safety clutch becomes inoperable after a relatively short period of use.

A clutch arrangement is known from British Pat. No. 1,415,138, which has a ball pocket clutch arranged between the surface of the clutch ring and the surface of the chuck body, in addition to the ball pockets in the outside surface of the chuck body, and is provided with an offset circular release ring groove which is connected to the ball pockets via an appropriate groove. When an overload occurs, the clutch balls slide in a recess which is slanted in relation to the connection groove, and run into this release ring groove. However, on the other hand, this known arrangement has the disadvantage that over a period of time, because of unavoidable deflection of the release ring groove in the discharge area of the groove, in relation to the ball pockets, there occurs constant impact. Furthermore, this clutch is exclusively suitable only for thread-cutting apparatus working in one direction of rotation. As has already been pointed out above, the same applies in the case of the saftey clutch according to German Auslegeschrift No. 25 11 148. By means of the slanting inclinations of the particular grooves or counterpockets, in the two above mentioned apparatus, when the direction of rotation is reversed, there immediatly occurs a re-engagement of the clutch, and it is then not possible to disengage the clutch in this other direction of rotation. Simultaneous disengagement for the counter-rotational direction is therefore excluded, because each case requires a given slanting inclination of the grooves with respect to the direction of rotation.

An object of the present invention is to provide a safety or overload clutch of the initially discussed kind so that, on the one hand, during the operation thereof, there cannot occur any wear which would impair its functioning, and on the other hand, the safety clutch can be utilized simultaneously for both directions of rotation.

The object of the invention is achieved by providing ball pockets as axially extending grooves, and counterpockets which open up at least on one side into open release channels which are axially offset in relation to the pressure ring, whereby the width of the release channels basically corresponds to the diameter of the clutch balls.

By means of the arrangement according to the invention, the clutch balls do not remain in one and the same transversal plane perpendicular to the longitudinal axis and cannot only be displaced outwardly through the open slots of the clutch ring, as for instance according to German Auslegeschrift No. 25 11 148, but when the clutch balls are released out of the ball pockets by means of axial movement, which is only possible by means of the configuration of the ball pockets in the form of grooves, the clutch balls are axially shifted into the release channels.

On the one hand, this arrangement allows a configuration, whereby the counterpockets are provided with radially extending contact areas which are configured as inclined ramps in relation to the axially offset release channels, with the result that inclinations in or against the direction of rotation are avoided, which is why such a safety clutch can only function in one direction of rotation.

This subsequently makes possible in a further development of the invention to provide release channels on both sides of the counterpockets, so that such a safety clutch can be used in the same way for both counterclockwise and clockwise rotation. Furthermore, by means of providing the apparatus according to the invention not only with axial, but also with radial movement of the clutch balls from the clutching position into the release position under utilization of contact areas of the counterpockets, the contact areas being configured as inclined ramps, there can also be utilized pressure rings provided with continuous flat frontal surfaces, preferably perpendicular to the axis. Such flat pressure rings obviously are practically not exposed to any interfering wear during operation. In particular, wear of any kind would only be conceivable in the form of a circular channel impressing itself. However, this can be largely excluded because of the large surface occurring in practical applications and would not lead to any impairement of functioning.

The safety clutch according to the invention can be used not only for clutches having a driven clutch ring but also for those having a continuous chuck body, whereby in this case, ball pockets configured as axial grooves are provided in the external surface of the chuck body and the counterpockets are provided on the clutch ring. In the same way, the construction according to the invention is also suitable for clutches having a divided or two-piece chuck body, whereby the clutch ring, which is connected to rotate with the section on the side of the motor, should be provided on its inner surface with groove-shaped axially extending ball pockets, whereas the counterpockets are provided in the external surface of the section on the tool-side of the chuck body.

Furthermore, it is also in the scope of the invention to provide that the bottom of the release channels extends in a plane essentially perpendicular the the rotational axis. The stable release position of the clutch balls or the like, i.e., keeping the clutch balls in these release channels, so that, periodically, when rotation continues, the clutch balls cannot enter into the ball pockets of the counterpiece, which would cause the clutch to impact, is attained by a low frictional force with which the balls make contact in the radial release channels, which are open, either on the external surface of the drill chuck or on the inside surface of the clutch ring, so that by means of this drag or frictional force, the clutch balls are always pressed in the direction of the remote end of the counterpocket of the release channel. By means of a short-time reversal of the rotational direction, there takes place a return movement of the clutch balls into the counterpockets, whereby the same also applies to the configuration having overload channels on two sides. The extent of frictional force, which keeps the balls stably in the release position, is determined by the depth of the release channel and changes by pressure adjustment of the clutch by means of the variable initial tension of the cup springs.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

BRIEF DESCRIPTION OF THE DRAWINGS

FIG. 1 is a longitudinal sectional view through a quick-change insert, in particular for thread-cutting chucks, having an overload safety clutch according to one embodiment of the invention, FIG. 2 is a cross-sectional view taken along the line II—II in FIG. 1, FIG. 3 is an enlarged detail view of one of the ball pockets shown in FIG. 2;

FIG. 4 is a view taken along the line IV—IV in FIG. 3;

FIGS. 5 and 6, as well as

FIGS. 7 and 8 are views similar to FIGS. 3 and 4 respectively, with FIGS. 5 and 6 showing a position during releasing of the clutch balls and FIGS. 7 and 8 showing the stable releasing position respectively.

DESCRIPTION OF THE PREFERRED EMBODIMENTS

Figure 9:
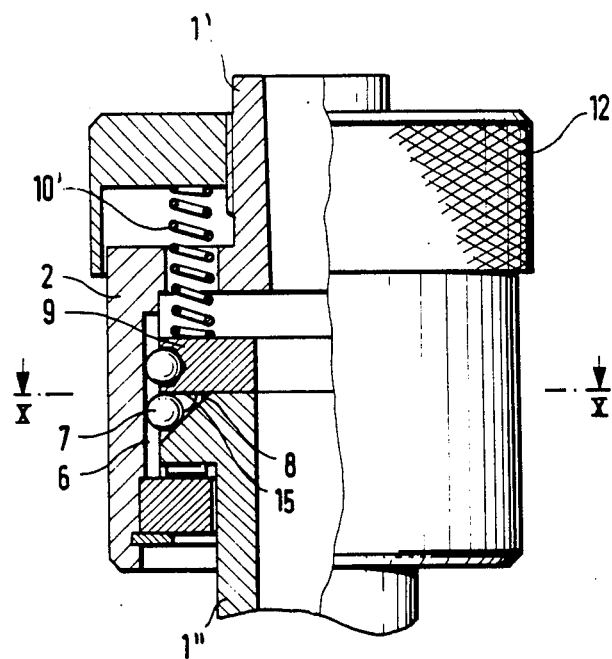
FIG. 9 is a partially broken-away side view through a chuck having a clutching apparatus according to another embodiment of the invention for a driven chuck body.

FIGS. 1 to 8 show a quick-change insert having a safety clutch according to one embodiment of the invention, wherein a clutch ring 2, which coaxially surrounds a continuous chuck body 1, is being driven. This is not illustrated in detail, nor are the parts described in the following section which are generally used in such inserts, such as for instance, ball bearings or the like. The chuck body 1 is clamped into the machine by its upper shaft section 4, and a tool can be inserted into the recess 5, such as for instance, a thread-cutting tool. In the external surface 3 of the chuck body 1, there are placed axially extending, i.e., parallel to the direction of rotation, ball pockets 6 configured as grooves. Each ball pocket 6 of the chuck body 1 has an associated counterpocket 8 in the clutch ring 2, which together receive a clutch ball 7 (see in particular FIGS. 3 and 4), in order to attain a coupling between the chuck body 1 and the clutch ring 2. The clutch balls 7 are under the effect of a pressure ring 9 which is pressed by cup springs 10 against the clutch balls 7. The springs 10 are supported on a rigid ring 11 of a casing 12 connected to the clutch ring 2. Under the effect of the initially stressed pressure ring 9, the clutch balls lie in the engaged and clutching position shown in FIGS. 3 and 4.

When an overload occurs, the balls are axially moved along the counterpocket 8, which is configured as an inclined ramp 13, and thereby press the pressure ring 9 downwardly against the bias of the cup springs 10. Depending on the direction of rotation, the balls thereby enter into one of the overload channels 14a or 14b, which are located in the surface 15 of the clutch ring 2. The overload channels 14a, 14b are offset in relation to the counterpocket 8 and are open towards the pressure ring 9. Because of the frictional force of the clutch ball 7 making contact at the surface area 15 of the pressure ring 9 (see in particular FIG. 6), the clutch ball is moved to the end of the particular overload channel 14a, 14b, so that it remains therein in a stable release position as long as there are different rotational speeds between the chuck body and clutch ring, as is the case after an overload release. This stable release position is shown in FIGS. 7 and 8.

After an overload occurs, the clutch is engaged again by means of a short-term reversal of the relative direction of rotation, whereby the balls 7, because of the remaining, residual axial pressing-in pressure on the frontal area 15 of the pressure ring 9 move again into the counterpockets 8, and from there are released again into the ball pockets 6, thereby attaining the same position as before, which re-establishes the engagement of the clutch.

Figure 10:
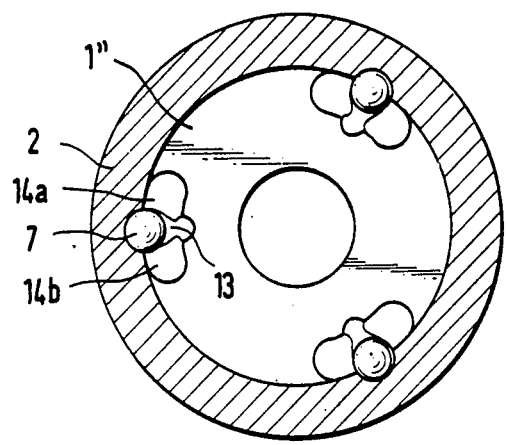
FIG. 10 is a cross-section taken along the line X—X in FIG. 9 and FIGS. 11 to 16 are enlarged views similar to FIGS. 3 to 8 respectively showing the relative positions of the ball pocket clutch but relating to the embodiment of FIGS. 9 and 10.

The arrangement according to FIGS. 9 to 16 basically differs from the arrangement according to FIGS. 1 to 8 in that FIGS. 9–16 relate to a version with a driven chuck body, whereby in this case, the chuck body is subdivided into two parts 1' and 1", of which the former is clamped into the machine and the latter serves for receiving the actual tool. Resembling a kinematical reversal of the clutch arrangement according to FIGS. 1–8, the clutch ring 2 is fixedly connected to the side of the drive which corresponds to the section 1' of the chuck body, and has ball pockets 6 configured as axial grooves, whereas the counterpockets 8 are arranged in this case in the external surface on the tool-side of section 1" of the chuck body. In consideration of the reversed arrangement of ball pockets and counterpockets, this configuration otherwise corresponds entirely to the version of FIGS. 1 to 8. In the configuration according to FIG. 9, the ball pockets 6 configured as axial grooves are simultaneously also used as support grooves for the ball-supported connection of the pressure ring 9 to the clutch ring 2 so that the pressure ring 9 rotates with the clutch ring 2. In the configuration according to FIG. 9, helical pressure springs 10' are used instead of the cup springs 10.

What I claim is:

1. A safety overload clutch operable between an engaged and disengaged position comprising a drive member and a driven member, each of said members having at least a partial cylindrical configuration with one of said members being coaxially disposed relative to the other of said members, ball pockets provided in said one member, clutch balls receivable in said ball pockets when the clutch is in said engaged position, said ball pockets having a depth less than the diameter of said clutch balls, said ball pockets defining grooves extending longitudinally parallel to the axis of said members, said clutch balls being displaced from said ball pockets when the clutch is in said disengaged position, an inclined ramp means in the other of said members receiving said clutch balls when the clutch passes from said engaged to said disengaged position, said inclined ramp means being inclined at an angle other than a right angle relative to the axes of said members such that said clutch ball moves radially and axially along said inclined ramp means when passing between said engaged and desengaged positions, a pressure ring carried by said other member, biasing means between said pressure ring and said other member biasing pressure ring in an axial direction, said pressure ring engaging said clutch balls such that said biased pressure ring urges said clutch balls into said engaged position, and a release channel in said other member opening up to said inclined ramp means that upon a torque overload condition, said balls overcome the bias of said pressure ring and pass in both a radial and axial direction from said ball pockets along said inclined ramp means into said release channel, said release channel having a cross-sectional configuration which precludes said clutch balls from being subjected to the application of a radial biasing force induced by said biasing means when said clutch balls are in said release channel.

2. A safety overload clutch according to claim 1, wherein said release channel has a width substantially equal to the diameter of said clutch balls.

3. A safety overload clutch according to claim 1, wherein said release channel extends in a generally circumferential direction and said inclined ramp means is disposed midway between ends of said release channel.

4. A safety overload clutch according to claim 1, wherein the bottom of said release channel extends generally in a plane perpendicular to the axes of said members.

5. A safety overload clutch operable between an engaged and disengaged position comprising a drive member and a driven member, each of said members having at least a partial cylindrical configuration with one of said members being coaxially disposed relative to the other of said member, ball pockets provided in said one member, clutch balls receivable in said ball pockets when the clutch is in said engaged position, said ball pockets having a depth less than the diameter of said clutch balls, said ball pockets defining grooves extending longitudinally parallel to the axis of said members, said clutch balls being displaced from said ball pockets when the clutch is in said disengaged position, an inclined ramp means in the other of said members receiving said cluth balls when the clutch passes from said engaged to said disengaged position, said inclined ramp means being inclined at an angle other than a right angle relative to the axes of said members such that said clutch ball moves radially and axially along said inclined ramp means when passing between said engaged and disengaged positions, a pressure ring carried by said other member, biasing means between said pressure ring and said other member biasing said pressure ring in an axial direction, said pressure ring engaging said clutch balls such that said biased pressure ring urges said clutch balls into said engaged position, and a release channel in said other member opening up to said inclined ramp means such that upon a torque overload condition, said balls overcome the bias of said pressure ring and pass in both a radial and axial direction from said ball pockets along said inclined ramp means into said release channel, said release channel having a cross-sectional configuration which defines a portion of a circle having a diameter substantially equal to the diameter of said clutch balls such that said release channel receives said clutch balls to preclude said clutch balls from being subjected to the application of a radial biasing force induced by said biasing means when said clutch balls are in said release channel.

6. A safety overload clutch according to claim 5 wherein said release channel has a width substantially equal to the diameter of said clutch balls.

7. A safety overload clutch according to claim 5, wherein said release channel has a first part on one side of said inclined ramp means and a second part on the other side of said inclined ramp means.

8. A safety overload clutch according to claim 7, wherein said first and second parts of said release channel extend generally in a circumferential direction.

9. A safety overload clutch according to claim 5, wherein said release channel extends in a generally circumferential direction and said inclined ramp means is disposed midway between ends of said release channel.

10. A safety overload clutch according to claim 5, wherein the bottom of said release channel extends generally in a plane perpendicular to the axes of said members.

11. A safety overload clutch according to claim 5, wherein said pressure ring has an annular surface which engages said clutch balls, said annular surface being disposed in a plane which is perpendicular to the axes of said members.

12. A safety overload clutch according to claim 5, wherein said inclined ramp means is arranged relative to said release channel such that said clutch balls pass through an intermediate position between said engaged and disengaged position, said clutch balls in said intermediate position being disposed midway between the ends of said release channel and displaced from said ball pockets.

13. A safety overload clutch according to claim 12, wherein said clutch balls are displaced axially due to the bias of said biased pressure ring when moving between said intermediate position and said engaged position.

14. A safety overload clutch according to claim 5, wherein said pressure ring is axially displaced relative to said release channel.

15. A safety overload clutch according to claim 18, wherein said pressure ring frictionally engages said clutch balls such that said clutch balls are disposed in a stable release position in an end of said release channel when the clutch is in said disengaged position.

16. A safety overload clutch according to claim 15, wherein said clutch balls are disposed in one end of said release channel when the overload occurs in one relative rotational direction of said members and said clutch balls are disposed in another end of said release channel when the overload occurs in the other relative rotational direction of said members, said clutch balls being operable to pass from said one end to said other end of said release channel without passing into said ball pockets.

17. A safety overload clutch according to claim 5, wherein said one member is a driven cylindrical clutch ring and said other member is a chuck body, said clutch ring being coaxially disposed outside said chuck body, said clutch ring having an inner cylindrical surface, said ball pockets being disposed in said inner cylindrical surface.

18. A safety overload clutch according to claim 5, wherein one of said members is a clutch ring, said other member receiving a tool to be driven, said clutch ring having an internal cylindrical surface, said ball pockets being disposed in said internal cylindrical surface.

19. A safety overload clutch according to claim 5, wherein one of said members is a clutch ring, said clutch ring having an internal cylindrical surface, said ball pockets being disposed in said internal cylindrical surface, said other member receiving a tool to be driven, said other member having an external annular surface, said inclined ramp means being disposed in said annular surface.

* * * * *